US012583317B2

(12) United States Patent
Taga et al.

(10) Patent No.: US 12,583,317 B2
(45) Date of Patent: Mar. 24, 2026

(54) INPUT DEVICE FOR A VEHICLE

(71) Applicant: TOYOTA JIDOSHA KABUSHIKI KAISHA, Toyota (JP)

(72) Inventors: Toko Taga, Toyota (JP); Kentaro Matsumoto, Toyota (JP); Moto Takabatake, Mountain View, CA (US)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/678,736

(22) Filed: May 30, 2024

(65) Prior Publication Data

US 2024/0424898 A1 Dec. 26, 2024

(30) Foreign Application Priority Data

Jun. 23, 2023 (JP) ................................. 2023-103747

(51) Int. Cl.
*B60K 35/10* (2024.01)
*B60K 35/22* (2024.01)

(52) U.S. Cl.
CPC .............. *B60K 35/10* (2024.01); *B60K 35/22* (2024.01); *B60K 2360/1438* (2024.01); *B60K 2360/167* (2024.01); *B60K 2360/175* (2024.01); *B60K 2360/179* (2024.01); *B60K 2360/1868* (2024.01); *B60K 2360/349* (2024.01)

(58) Field of Classification Search
CPC .................... B60K 35/10; B60K 35/22; B60K 2360/1438; B60K 2360/167; B60K 2360/175; B60K 2360/179; B60K 2360/1868; B60K 2360/349; B60K 35/00; B60K 2360/782; B60K 35/28; B60K 35/29; B60K 35/60; B60K 2360/171; B60K 2360/1876; B60Y 2400/92
See application file for complete search history.

(56) References Cited

U.S. PATENT DOCUMENTS

| | | | |
|---|---|---|---|
| 2009/0210110 A1* | 8/2009 | Dybalski ................ | B60K 35/22 |
| | | | 345/173 |
| 2012/0105335 A1* | 5/2012 | Suddreth ............... | G06F 3/0393 |
| | | | 345/173 |
| 2012/0127115 A1* | 5/2012 | Gannon .............. | G06F 3/03547 |
| | | | 345/173 |
| 2016/0004418 A1* | 1/2016 | Lee ........................ | B60K 35/10 |
| | | | 715/765 |

(Continued)

FOREIGN PATENT DOCUMENTS

| | | |
|---|---|---|
| DE | 102015226586 A1 | 6/2017 |
| JP | S61-077545 A | 4/1986 |

(Continued)

*Primary Examiner* — Douglas Wilson
(74) *Attorney, Agent, or Firm* — Dinsmore & Shohl LLP

(57) ABSTRACT

An input device for a vehicle, the input device includes: a display region provided in a vehicle cabin front portion, configured such that a predetermined image is displayed at the display region, and a touch sensor being provided at the display region, wherein, when a sliding operation of the image in the display region is detected on the basis of signals received from the touch sensor, the input device for a vehicle is configured to: output a signal corresponding to the sliding operation to on-board equipment; and move the image in the display region in accordance with the sliding operation.

14 Claims, 8 Drawing Sheets

(56)            References Cited

U.S. PATENT DOCUMENTS

| | | |
|---|---|---|
| 2018/0326851 A1 | 11/2018 | Kim et al. |
| 2019/0337388 A1 | 11/2019 | Hélot |
| 2020/0015373 A1* | 1/2020 | Caillaud ................ B60K 37/00 |
| 2020/0247217 A1 | 8/2020 | Doi |
| 2020/0353971 A1* | 11/2020 | Nakajima .......... B60H 1/00292 |
| 2021/0107358 A1* | 4/2021 | Shibata ................... B62D 1/16 |

FOREIGN PATENT DOCUMENTS

| | | |
|---|---|---|
| JP | 2006-177401 A | 7/2006 |
| JP | 2010-064691 A | 3/2010 |
| JP | 2020-124951 A | 8/2020 |
| JP | 2020-160789 A | 10/2020 |
| JP | 2021-041848 A | 3/2021 |
| JP | 2021-062735 A | 4/2021 |
| JP | 2022-088089 A | 6/2022 |

* cited by examiner

14

84 — DRIVING MODE ACQUISITION SECTION

86 — VEHICLE SPEED ACQUISITION SECTION

88 — SLIDING OPERATION DETECTION SECTION

90 — IMAGE DISPLAY SECTION

92 — OUTPUT SECTION

INPUT DEVICE FOR A VEHICLE

CROSS-REFERENCE TO RELATED APPLICATION

This application is based on and claims priority under 35 USC 119 from Japanese Patent Application No. 2023-103747 filed on Jun. 23, 2023, the disclosure of which is incorporated by reference herein.

BACKGROUND

Technical Field

The present disclosure relates to an input device for a vehicle.

Related art

US Patent Application Publication No. 2018/0326851 discloses a structure equipped with a display portion that protrudes from an instrument panel to a side at which a steering handle is disposed. In particular, US Patent Application Publication No. 2018/0326851 recites control of a function of a vehicle by touch input in a state in which information relating to the function of the vehicle is displayed.

However, in the structure recited in US Patent Application Publication No. 2018/0326851, information that changes is displayed in a different region from a region that is touched in a touch operation by a vehicle occupant. Therefore, there is scope for improvement in regard to instinctive understanding of changing conditions of on-board equipment.

SUMMARY

The present disclosure provides an input device for a vehicle that enables comfortable and instinctive control of on-board equipment.

An input device for a vehicle according to a first aspect includes a display region provided in a vehicle cabin front portion, configured such that a predetermined image is displayed at the display region, and a touch sensor being provided at the display region, wherein, when a sliding operation of the image in the display region is detected on the basis of signals received from the touch sensor, the input device for a vehicle is configured to: output a signal corresponding to the sliding operation to on-board equipment; and move the image in the display region in accordance with the sliding operation.

In the input device for a vehicle according to the first aspect, the display region in which the predetermined image is displayed is provided in the vehicle cabin front portion, and the touch sensor is provided at the display region. When, on the basis of signals received from the touch sensor, the input device for a vehicle detects a sliding operation that slides the image within the display region, the input device for a vehicle outputs signals according to the sliding operation to the on-board equipment. The image moves in the display region in accordance with the sliding operation. Therefore, a vehicle occupant may instinctively control the on-board equipment while seeing positions of the image.

In an input device for a vehicle according to a second aspect, in the first aspect, the display region is disposed at the vehicle rear side relative to an instrument panel.

The input device for a vehicle according to the second aspect is easier for a vehicle occupant to operate than a structure in which a display region is provided at an instrument panel.

In an input device for a vehicle according to a third aspect, in the second aspect: the display region is provided at each of: a plate-shaped right side display portion that extends further toward a vehicle right side than the steering handle, and that has a thickness direction in a vehicle front-rear direction, and a plate-shaped left side display portion that extends further toward the vehicle left side than the steering handle, and that has a thickness direction in the vehicle front-rear direction; and finger rest portions are provided at faces at an opposite side of the right side display portion and of the left side display portion from sides thereof at which the display region is provided.

In the input device for a vehicle according to the third aspect, because the display region may be operated while a finger is resting on a finger rest portion, operability may be improved.

In an input device for a vehicle according to a fourth aspect, in the second aspect: the display region spans from an outer side to an inner side of the steering handle as viewed from a vehicle rear side; an operation item having a high relative frequency of operation is displayed in a region of the display region at the outer side of the steering handle; and an operation item having a low relative frequency of operation is displayed in a region of the display region at the inner side of the steering handle.

In the input device for a vehicle according to the fourth aspect, because an operation item with a relatively high frequency of operation is displayed at a position that is easy for a vehicle occupant to operate, comfort may be improved.

In an input device for a vehicle according to a fifth aspect, in the second aspect, information on on-board equipment relating to travel of the vehicle is displayed in a region of the display region at a vehicle width direction outer side relative to a grip portion of the steering handle.

In the input device for a vehicle according to the fifth aspect, the information on the on-board equipment relating to running of the vehicle is displayed in the region at the vehicle width direction outer side relative to the grip portion, that is, at the opposite side of the grip portion from a side thereof at which a passenger side seat is disposed. Therefore, accidental operation by an occupant of the passenger side seat may be inhibited.

In an input device for a vehicle according to a sixth aspect, in the second aspect, information on on-board equipment relating to a matter other than travel of the vehicle is displayed in a region of the display region at a vehicle width direction inner side relative to a grip portion of the steering handle.

In the input device for a vehicle according to the sixth aspect, because the information on the on-board equipment relating to matters other than travel of the vehicle is displayed at the side at which the passenger side seat is disposed, even an occupant of the passenger side seat may perform an operation easily.

In an input device for a vehicle according to a seventh aspect, in the fifth aspect, content relating to a current gear shift position of the vehicle is displayed in the region of the display region at the vehicle width direction outer side relative to the steering handle and, during travel of the vehicle, the content is toned down compared to when the vehicle is stopped.

In the input device for a vehicle according to the seventh aspect, because the brightness of toned down during travel, distraction caused by the display may be suppressed. That is, because the display region is closer to the vehicle occupant than the instrument panel is, the display is more easily seen by the vehicle occupant than if displayed at the instrument panel. However, a sense of distraction may arise when the vehicle occupant is not looking at the display region. Therefore, distraction felt by the vehicle occupant may be suppressed by toning down the display during travel.

In an input device for a vehicle according to an eighth aspect, in the seventh aspect, during travel in a driving support mode that autonomously performs accelerator operations and steering, content relating to setting of an inter-vehicle distance relative to a preceding vehicle is displayed in the region of the display region at the vehicle width direction outer side relative to the steering handle.

In the input device for a vehicle according to the eighth aspect, during travel in a driving mode, a vehicle-to-vehicle distance from a preceding vehicle may easily change. The meaning of the term "driving support mode" as used herein is intended to encompass an autonomous driving mode in which there is no need for a vehicle occupant to pay attention to surrounding conditions. The term "driving support mode" is further intended to broadly encompass a driving support mode in which the vehicle occupant is required to grip the steering handle.

In an input device for a vehicle according to a ninth aspect, in the eighth aspect, at a time of switching from the driving support mode to manual driving, the content of the display region is switched to the content relating to the gear shift position.

In the input device for a vehicle according to the ninth aspect, because display content is automatically changed between the driving support mode and the manual driving mode, convenience may improved.

As described above, according to the input device for a vehicle according to the present disclosure, on-board equipment may be controlled comfortably and instinctively.

BRIEF DESCRIPTION OF THE DRAWINGS

An exemplary embodiment of the present disclosure will be described in detail based on the following figures, wherein.

DETAILED DESCRIPTION

Figure 1:
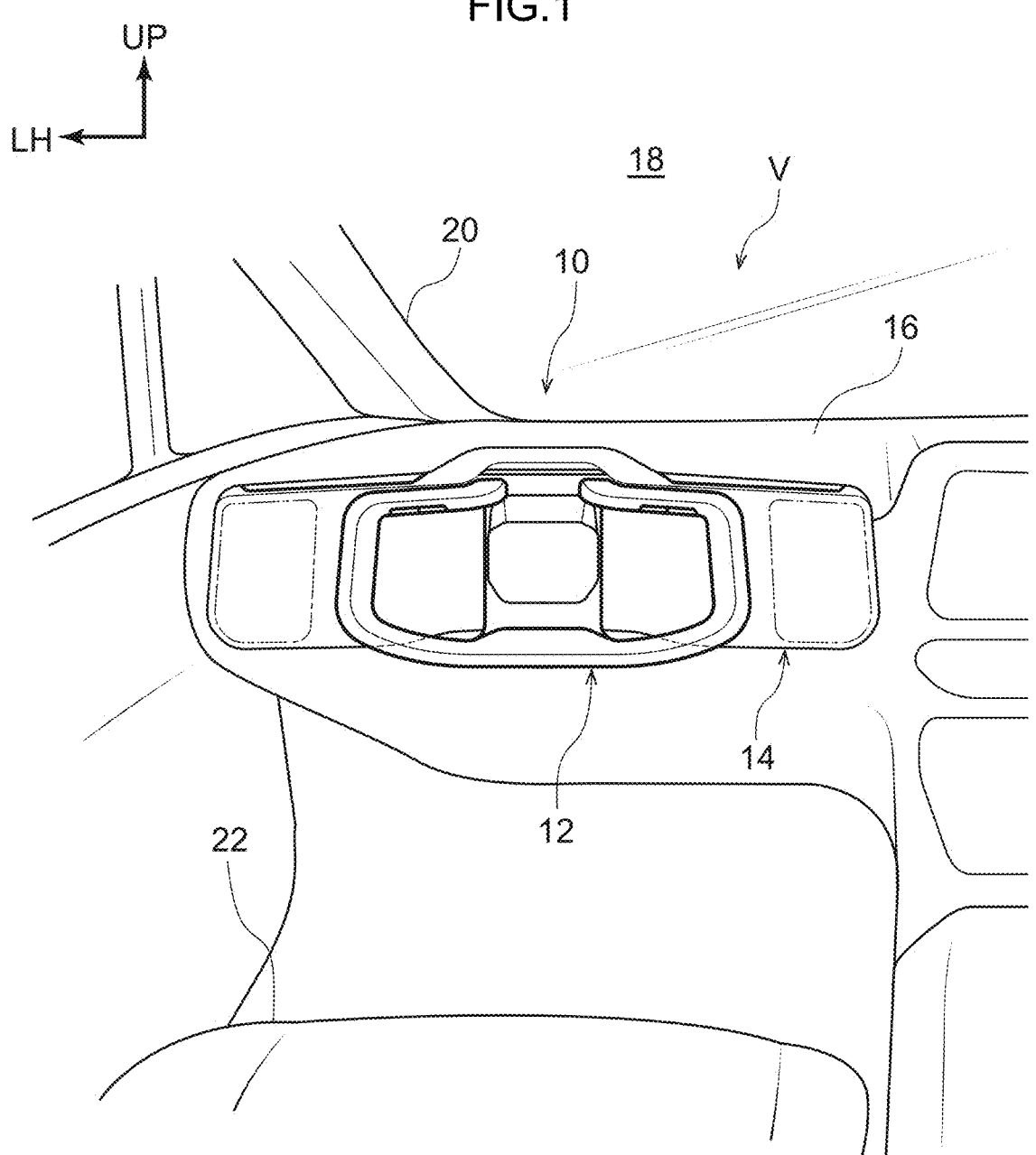
FIG. 1 is a schematic view in which a driver seat vicinity of a vehicle in which an input device for a vehicle according to an exemplary embodiment is employed is seen from the vehicle rear side.

A steering module 10 equipped with an input device for a vehicle 14 according to an exemplary embodiment is described with reference to the drawings. The arrow FR, arrow UP and arrow LH in the drawings indicate, respectively, a vehicle front side, vehicle upper side and vehicle left side. Below, where descriptions are given using directions to front and rear, left and right, and upper and lower, unless particularly specified these refer to front and rear in the vehicle front-and-rear direction, left and right in the vehicle width direction, and upper and lower in the vehicle vertical direction.

As illustrated in FIG. 1, an instrument panel 16 is provided at a front portion of a cabin interior of the vehicle V. The instrument panel 16 extends in the vehicle width direction, and a steering handle 12 is provided at the vehicle left side of the instrument panel 16. That is, the present exemplary embodiment is an example of a left-hand drive car in which the steering handle 12 is provided at the left side and a driver seat is set at the vehicle left side, but this is not limiting. For example, the exemplary embodiment may be applied to a right-hand drive car in which the steering handle 12 is provided at the vehicle right side.

A windshield glass 18 is provided at a front end portion of the instrument panel 16. The windshield glass 18 extends in the vehicle vertical direction and the vehicle width direction, dividing the cabin interior from the cabin exterior.

A vehicle left side end portion of the windshield glass 18 is fixed to a front pillar 20 at the vehicle left side. The front pillar 20 extends in the vehicle vertical direction, and the windshield glass 18 is fixed to a vehicle width direction inner side end portion of the front pillar 20.

A vehicle seat 22 is disposed at the vehicle rear side relative to the instrument panel 16. The vehicle seat 22 is a driver seat on which a vehicle occupant sits. The vehicle V according to the present exemplary embodiment is configured to be switchable between an autonomous driving mode, in which the vehicle runs without the vehicle occupant conducting driving operations, and a manual driving mode. The vehicle V is configured to enable running in the autonomous driving mode when predetermined conditions are satisfied in the manual driving mode. The steering module 10 is provided to the front of the vehicle seat 22.

Steering Module 10

Figure 2:
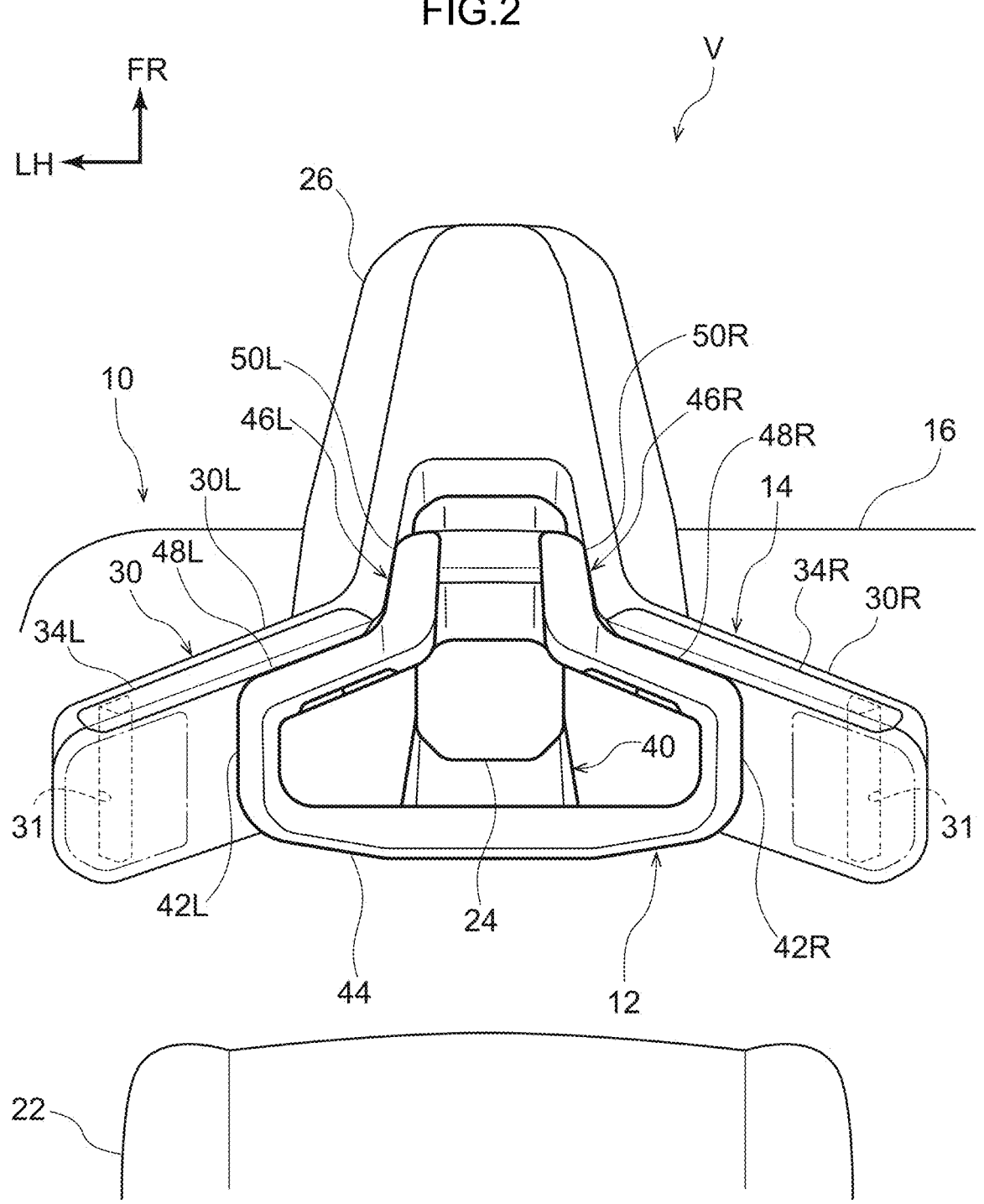
FIG. 2 is a schematic view in which the driver seat vicinity is seen diagonally from the upper rear.

FIG. 2 is a schematic view in which the driver seat vicinity is seen diagonally from the upper rear. As illustrated in FIG. 2, the steering module 10 includes the steering handle 12 and the input device for a vehicle 14 (which may below be referred to as the input device 14). The vehicle occupant grips the steering handle 12 and steers. The input device 14 functions as a display device that displays information to a vehicle occupant.

The steering module 10 is provided with a module base 26 that is attached to the instrument panel 16. The module base 26 is formed in a shape that tapers in plan view from the vehicle rear side to the vehicle front side. A front end portion of the module base 26 is fixed to an upper face of the instrument panel 16.

A column portion 24 that structures the steering handle 12 is provided at the vehicle width direction middle of a rear end portion of the module base 26. The input device 14 is provided at both of vehicle width direction end portions of the rear end portion of the module base 26. The input device 14 is disposed between the steering handle 12 and the instrument panel 16, and displays information to the vehicle occupant.

Steering handle 12

The steering handle 12 includes the column portion 24, a base portion 40, a right grip portion 42R, a left grip portion 42L, a connecting portion 44, an upper right perimeter portion 46R and an upper left perimeter portion 46L.

The column portion 24 projects from the instrument panel 16 through the module base 26 toward the vehicle rear. Sensors, which are capable of detecting a vehicle occupant and are not illustrated in the drawings, are provided at a distal end portion of the column portion 24. The sensors include a sensor that detects the whole face of a vehicle occupant, a sensor that detects the eyes, a sensor that detects an eyeline direction and a sensor that detects posture, or the like.

Air blowing holes, which are capable of blowing air toward the vehicle rear and are not illustrated in the drawings, are also provided at the distal end portion of the column portion 24. For example, an air conditioning apparatus is provided at the vehicle front side relative to the instrument panel 16 and structures are formed such that air whose temperature is controlled by the air conditioning apparatus is blown through the interior of the column portion 24 and from the air blowing holes toward the driver seat. Thus, because the air blowing holes are provided in the distal end portion of the column portion 24, there is no need to dispose a register at the instrument panel 16, and flexibility of design of the vehicle interior is improved. Moreover, air may be blown from closer to the vehicle occupant than in a structure in which air is blown from the instrument panel 16.

As an example in the present exemplary embodiment, the column portion 24 is structured to be tiltable in the vertical direction relative to the module base 26. That is, the main body portion 30 is structured to enable adjustment of a position thereof in the vertical direction independently of the steering handle 12.

The base portion 40 is provided at the column portion 24. The base portion 40 extends in the vehicle vertical direction and the vehicle width direction. The base portion 40 is turnably attached to a portion of the column portion 24 between a base end portion and the distal end portion.

The right grip portion 42R, which may be gripped by the vehicle occupant, is disposed at the right side relative to the base portion 40. The left grip portion 42L, which may be gripped by the vehicle occupant, is disposed at the left side relative to the base portion 40. The right grip portion 42R and left grip portion 42L both extend in the vehicle vertical direction and are formed in shapes with left-and-right symmetry about the center of the steering handle 12.

A lower end portion of the base portion 40, a lower end portion of the right grip portion 42R and a lower end portion of the left grip portion 42L are connected in the vehicle width direction by the connecting portion 44. The connecting portion 44 is a long, narrow member that is disposed at the lower side relative to the column portion 24 and whose length direction is in the vehicle width direction. A vehicle width direction central portion of the connecting portion 44 is formed to be wider in the vehicle front-and-rear direction than both vehicle width direction end portions thereof.

The vehicle width direction central portion of the connecting portion 44 is fixed to the lower end portion of the base portion 40. A car horn switch may be provided at the vehicle width direction central portion of the connecting portion 44.

Both the vehicle width direction end portions of the connecting portion 44 are gently curved so as to gradually rise towards the two vehicle width direction sides and are formed integrally with the right grip portion 42R and the left grip portion 42L.

The upper right perimeter portion 46R is provided at an upper end portion of the right grip portion 42R. The upper right perimeter portion 46R includes an upper right steering portion 48R and a right sightline guide portion 50R. The upper right steering portion 48R extends diagonally to the front-left side from the upper end portion of the right grip portion 42R. The right sightline guide portion 50R extends further to the vehicle front from an end portion of the upper right steering portion 48R and is connected with an upper end portion of the base portion 40.

The upper left perimeter portion 46L is provided at an upper end portion of the left grip portion 42L. The upper left perimeter portion 46L includes an upper left steering portion 48L and a left sightline guide portion 50L. The upper left steering portion 48L extends diagonally to the front-right side from the upper end portion of the left grip portion 42L. The left sightline guide portion 50L extends further to the vehicle front from an end portion of the upper left steering portion 48L and is connected with an upper end portion of the base portion 40.

A gap is provided between the upper right perimeter portion 46R and the upper left perimeter portion 46L. A base end region of the module base 26 may be viewed through this gap. Accordingly, a display portion such as a display screen or the like may be provided in a region of the module base 26 between the upper right perimeter portion 46R and the upper left perimeter portion 46L.

Figure 3:
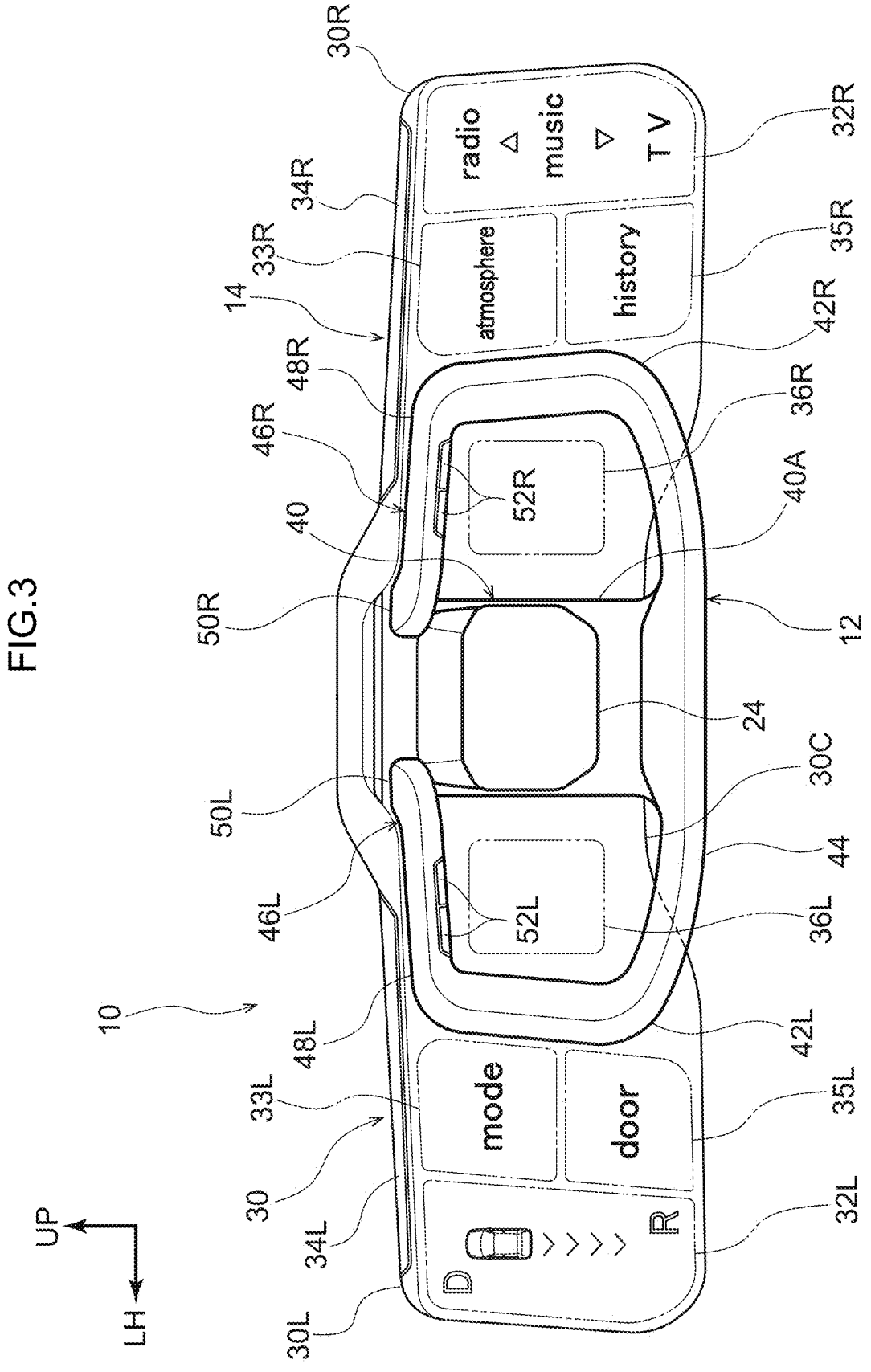
FIG. 3 is a magnified view of principal portions in which the input device for a vehicle according to the exemplary embodiment is seen from the vehicle rear side, the view illustrating a state during travel in a manual driving mode.

As illustrated in FIG. 3, two right steering handle switches 52R are provided at the upper right perimeter portion 46R. The two right steering handle switches 52R are provided side by side in a face at the vehicle rear side of the upper right steering portion 48R. Respectively different functions are assigned to the two right steering handle switches 52R. For example, functions such as a right indicator, switching between low beam and high beam, launching a voice input device, and the like may be assigned to the right steering handle switches 52R.

Meanwhile, two left steering handle switches 52L are provided at the upper left perimeter portion 46L. The two left steering handle switches 52L are provided side by side in a face at the vehicle rear side of the upper left steering portion 48L. Respectively different functions are assigned to the two left steering handle switches 52L. For example, functions such as a left indicator, starting a windshield wiper, launching active cruise control, and the like may be assigned to the left steering handle switches 52L.

The steering module 10 according to the present exemplary embodiment is structured as described above. The input device 14 and the steering handle 12 are disposed to be spaced apart in the vehicle front-and-rear direction.

Input Device for a Vehicle 14

FIG. 3 is a magnified view in which the steering module 10 is magnified and seen from the vehicle rear side. As illustrated in FIG. 3, the input device 14 is provided with a main body portion 30. The main body portion 30 extends further to both left and right sides (both sides in the vehicle width direction) than the steering handle 12, and is configured such that information is displayed on screens opposing the vehicle seat 22.

More specifically, the main body portion 30 is provided with a center portion 30C, a right side display portion 30R and the left side display portion 30L. The center portion 30C is disposed at a vehicle width direction middle portion of the steering module 10, the right side display portion 30R is disposed at the vehicle right side relative to the vehicle width direction middle of the steering module 10, and the left side display portion 30L is disposed at the vehicle left side relative to the vehicle width direction middle of the steering module 10.

The right side display portion 30R is formed in a substantially rectangular plate shape with a thickness direction in the vehicle front-and-rear direction. The right side display portion 30R is disposed to the vehicle front of a right side portion of the steering handle 12 and, in plan view, is angled to the vehicle rear side toward the vehicle right side. The left side display portion 30L is formed in a shape with left-and-right symmetry with the right side display portion 30R. That is, the left side display portion 30L is formed in a substantially rectangular plate shape with a thickness direction in the vehicle front-and-rear direction. The left side display portion 30L is disposed to the vehicle front of a left side portion of the steering handle 12 and, in plan view, is angled to the vehicle rear side toward the vehicle left side.

Display regions 32R, 33R and 35R, at which predetermined images are displayed, are specified in a screen at the vehicle rear side of the right side display portion 30R opposing the driver seat. Display regions 32L, 33L and 35L, at which predetermined images are displayed, are specified in a screen at the vehicle rear side of the left side display portion 30L opposing the driver seat. These display regions are described below.

As illustrated in FIG. 2, respective finger rest portions 31 are provided at a face at the vehicle front side of the right side display portion 30R and a face at the vehicle front side of the left side display portion 30L. In the present exemplary embodiment, as an example of each finger rest portion 31, a recess portion for resting a finger is formed. When a finger is hooked on this recess portion, operability of the input device 14 is improved.

As illustrated in FIG. 3, a right operation switch 34R and a left operation switch 34L are provided at an upper edge of the main body portion 30. The right operation switch 34R is provided at the upper edge of the right side display portion 30R and is formed in a long, narrow shape whose length direction is in the vehicle width direction. In some embodiments, if functions that may be operated regardless of information displayed at the input device 14 are assigned to the right operation switch 34R and left operation switch 34L. As an example in the present exemplary embodiment, a hazard lamp function is assigned to the right operation switch 34R and a high beam function is assigned to the left operation switch 34L, but this is not limiting.

Now, the display regions 32R, 33R and 35R specified at the right side display portion 30R and the display regions 32L, 33L and 35L specified at the left side display portion 30L are described.

Display Items in the Manual Driving Mode

FIG. 3 is a magnified view of principal portions in which the input device 14 according to the exemplary embodiment is seen from the vehicle rear side, the view illustrating a state during travel in the manual driving mode. As illustrated in FIG. 3, the display region 32R of the right side display portion 30R is a region at a vehicle width direction inner side (the vehicle right side) relative to the column portion 24 of the steering handle 12, being specified at the rightmost end of the right side display portion 30R. Information on on-board equipment relating to matters other than running of the vehicle V is displayed in the display region 32R.

As an example in the present exemplary embodiment, an operation item relating to on-board equipment related to entertainment is displayed at the display region 32R. The on-board equipment related to entertainment may be a music player, television, radio, video streaming service or the like.

The operation item displayed at the display region 32R may be operated by the vehicle occupant swiping a finger (thumb) of the right hand in a vertical direction in a state in which the vehicle occupant is gripping the right side display portion 30R. More specifically, when the vehicle occupant performs a sliding movement from up to down, a selection item is moved. Similarly, when the vehicle occupant performs a sliding operation from down to up, the selection item is moved in the opposite direction.

The display region 33R and display region 35R are specified adjacent to the display region 32R at the left side of the display region 32R. The display region 33R is disposed at an upper portion and displays an operation item relating to air conditioning. For example, a blowing amount and temperature of air blown from air blowing holes at each seat may be changed. The display region 35R is disposed at a lower portion and displays information on the vehicle V. Alternative displays may be implemented at the display regions 32R, 33R and 35R. The display regions 33R and 35R may extend further to the left side than the right grip portion 42R of the steering handle 12, in which case the right side display portion 30R is disposed to span from the outer side to the inner side of the steering handle 12 as seen from the vehicle rear side. In some embodiments, operation items with relatively high frequencies of operation are displayed in a region of the right side display portion 30R at the outer side of the steering handle 12, and operation items with relatively low frequencies of operation are displayed in a region of the right side display portion 30R at the inner side of the steering handle 12.

A display region 36R is specified at the vehicle left side relative to the display region 33R and display region 35R (the side thereof at which the column portion 24 is disposed). Items that do not need to be operated may be displayed at the display region 36R, being operation items with relatively low frequencies of operation. For example, items that the vehicle occupant does not need to operate, such as warning displays, social networking service (SNS) messages and the like may be displayed in the display region 36R, and items that are not operated during driving but operated while the vehicle is stopped may be displayed in the display region 36R. Thus, as an example in the present exemplary embodiment, the display regions 32R, 33R and 35R are specified at the outer side of the steering handle 12, and the display region 36R is specified at the inner side of the steering handle 12. However, configurations are possible in which display regions are provided only at the outer side of the steering handle 12.

Meanwhile, the display region 32L of the left side display portion 30L is a region at a vehicle width direction outer side (the vehicle left side) relative to the steering handle 12, being specified at the leftmost end of the left side display portion 30L. Information on on-board equipment relating to running of the vehicle V is displayed in the display region 32L.

As an example in the present exemplary embodiment, an operation item relating to a gear shift position is displayed at the display region 32L. More specifically, an operation item that enables switching of the gear shift position between drive (forward) and reverse (backward) is displayed.

When a predetermined condition is satisfied, the operation item displayed at the display region 32L may be operated by the vehicle occupant swiping a finger (thumb) of the left hand in the vertical direction in a state in which the vehicle occupant is gripping the left side display portion 30L. More specifically, the selection item is moved from the drive position to reverse by the vehicle occupant performing a sliding operation from up to down. Similarly, the selection item is moved from the reverse position to drive by the vehicle occupant performing a sliding operation from down to up. As an example in the present exemplary embodiment, during travel of the vehicle V, the display is toned down compared to when the vehicle V is stopped.

The display region 33L and display region 35L are specified adjacent to the display region 32L at the right side of the display region 32L. The display region 33L is disposed at an upper portion and displays an operation item for switching the driving mode. For example, when the display region 33L is operated, the driving mode may be switched from a low fuel consumption (low electricity consumption) eco mode to a sports mode in which accelerator operation is improved.

The display region 35L is disposed at a lower portion and displays a door operation item. More specifically, the vehicle occupant may conduct locking and unlocking of doors provided at the vehicle V by operating the display region 35L.

A display region 36L is specified at the vehicle right side relative to the display region 33L and display region 35L (the side thereof at which the column portion 24 is disposed). Items that do not need to be operated may be displayed at the display region 36L, being operation items with relatively low frequencies of operation. For example, displays may be implemented at the display region 36L similarly to the display region 36R. Thus, as an example in the present exemplary embodiment, the display regions 32L, 33L and 35L are specified at the outer side of the steering handle 12 and the display region 36L is specified at the inner side of the steering handle 12. However, configurations are possible in which display regions are provided only at the outer side of the steering handle 12.

Display Items in the Autonomous Driving Mode

Figure 4:
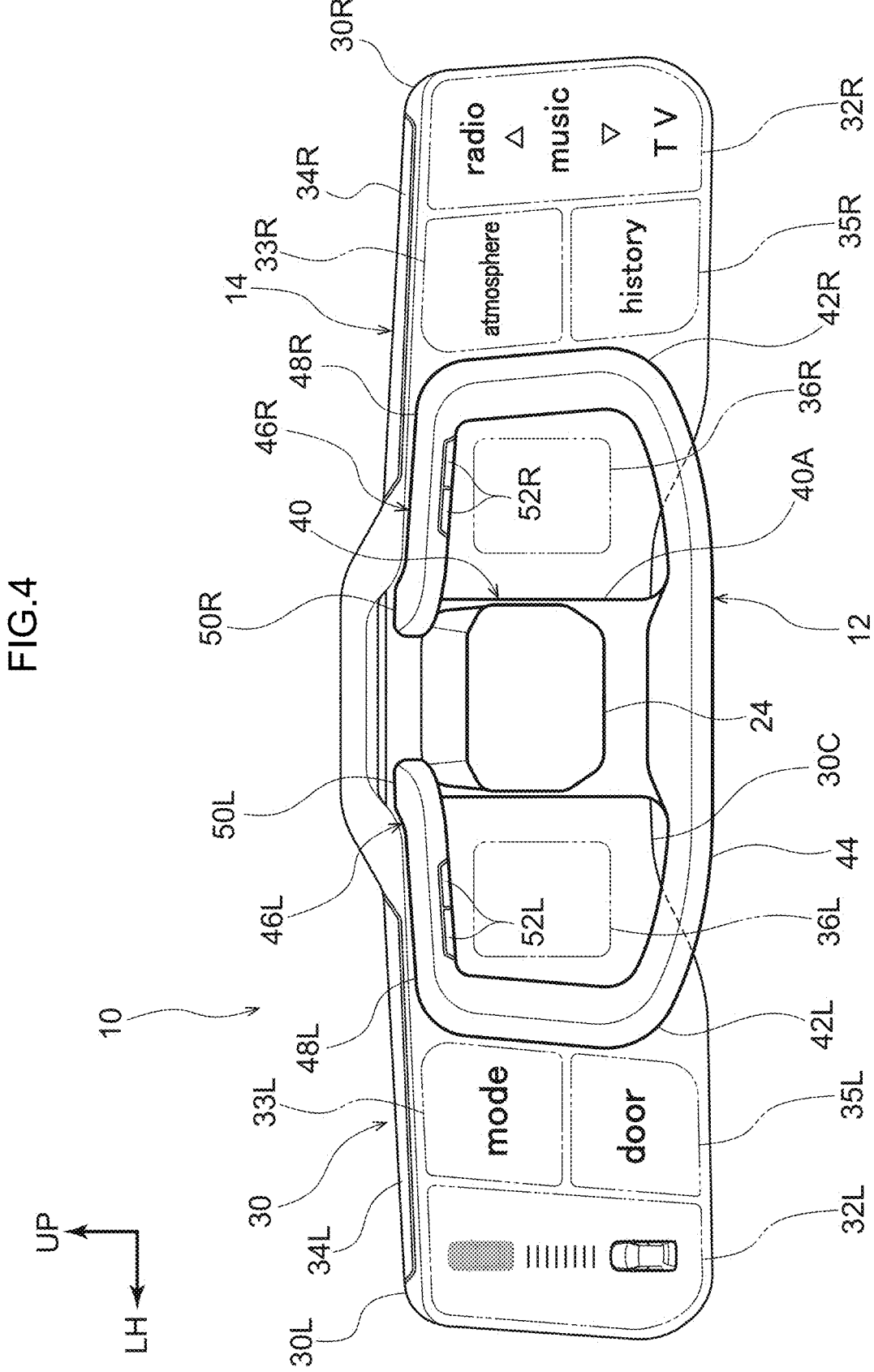
FIG. 4 is a magnified view of principal portions in which the input device for a vehicle according to the exemplary embodiment is seen from the vehicle rear side, the view illustrating a state during travel in a driving support mode.

FIG. 4 is a magnified view of principal portions in which the input device 14 according to the exemplary embodiment is seen from the vehicle rear side, the view illustrating a state during travel in the autonomous driving mode. As illustrated in FIG. 4, the display regions 32R, 33R and 35R of the right side display portion 30R respectively display content similar to FIG. 3, and the display regions 33L and 35L of the left side display portion 30L also display content similar to FIG. 3.

In the display region 32L of the left side display portion 30L, content relating to setting of a vehicle-to-vehicle distance between a preceding vehicle and the present vehicle is displayed. As an example in the present exemplary embodiment, an image depicting the preceding vehicle is displayed in an upper portion of the display region 32L, and an image depicting the present vehicle is displayed in a lower portion of the display region 32L. When the vehicle occupant slides the image representing the present vehicle vertically in a state in which the vehicle occupant is gripping the left side display portion 30L, the vehicle occupant may change the vehicle-to-vehicle distance in accordance with this sliding operation.

Hardware Structures of the Input Device 14

Figure 5:
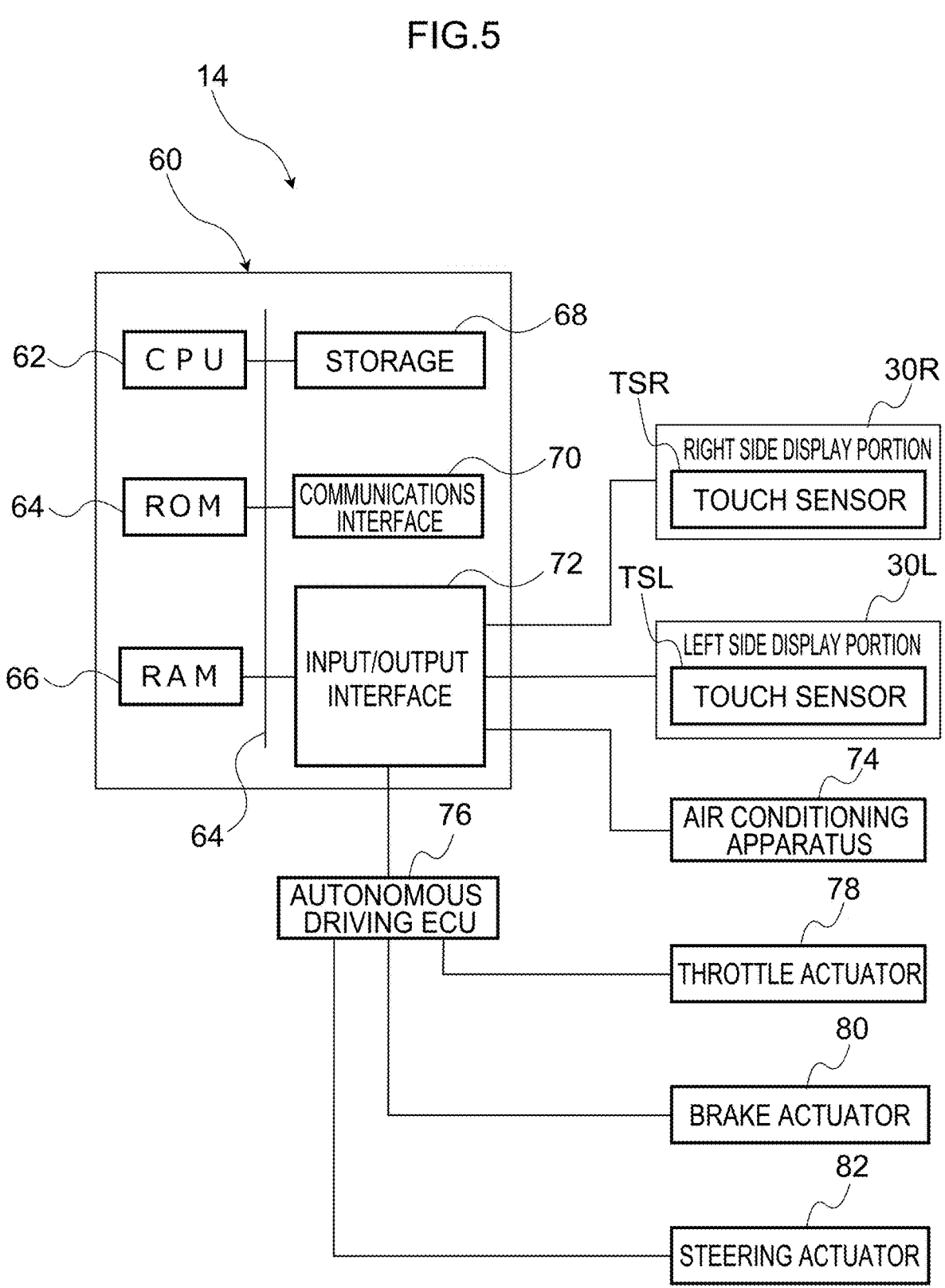
FIG. 5 is a block diagram illustrating hardware structures of the input device for a vehicle according to the exemplary embodiment.

As illustrated in FIG. 5, the input device 14 is provided with a control section 60. The control section 60 includes a CPU 62, ROM 64, RAM 66, storage 68, communications interface (communications I/F) 70 and an input/output interface (input/output I/F) 72. These structures are connected to be capable of communicating with one another via an internal bus 64.

The CPU 62 is a central arithmetic processing unit that executes various programs and controls respective parts. That is, the CPU 62 reads a program from the ROM 64 or the storage 68, and executes the program using the RAM 66 as a workspace. The CPU 62 performs control of the structures described above and various kinds of computational processing in accordance with programs recorded in the ROM 64 or storage 68.

The ROM 64 stores various programs and various kinds of data. The RAM 66 serves as a workspace, temporarily memorizing programs and data. The storage 68 is a non-transitory memory medium structured by an HDD or SSD. The storage 68 memorizes various programs, including an operating system, and various kinds of data.

The communications interface 70 is an interface for communicating with a server and other equipment. A standard such as, for example, Controller Area Network (CAN), Ethernet (registered trademark), Long-Term Evolution (LTE), Fiber Distributed Data Interface (FDDI), Wi-Fi (registered trademark) or the like may be employed.

The right side display portion 30R, the left side display portion 30L, an air conditioning apparatus 74 and an autonomous driving electronic control unit (ECU) 76 are connected to the input/output interface 72. A touch sensor TSR is provided at the right side display portion 30R, and a touch sensor TSL is provided at the left side display portion 30L. The touch sensor TSR is structured to enable the detection of positions of a finger of the vehicle occupant touching the right side display portion 30R and the like, and the touch sensor TSL is structured to enable the detection of positions of a finger of the vehicle occupant touching the left side display portion 30L and the like.

A throttle actuator 78, a brake actuator 80, and a steering actuator 82 are connected to the autonomous driving ECU 76. The throttle actuator 78 changes a throttle opening of the vehicle V. The brake actuator 80 changes braking force generated by a braking apparatus of the vehicle V. The steering actuator 82 changes steering amounts according to a steering apparatus of the vehicle V. The autonomous driving ECU 76 implements autonomous driving processing that causes the vehicle V to run autonomously without driving operations by a vehicle occupant.

Functional Structures of the Input Device 14

The input device 14 uses the hardware resources described above to realize various functions. The functional structures realized by the input device 14 are described with reference to FIG. 6.

Figure 6:
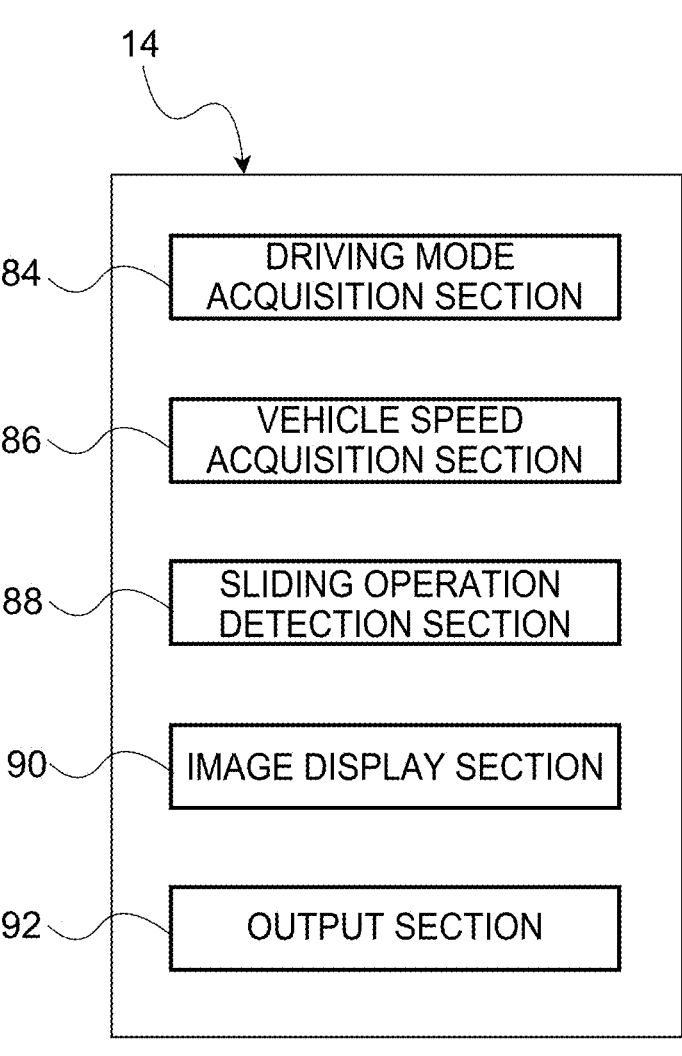
FIG. 6 is a block diagram illustrating functional structures of the input device for a vehicle according to the exemplary embodiment.

As illustrated in FIG. 6, the input device 14 includes, as functional structures, a driving mode acquisition section 84, a vehicle speed acquisition section 86, a sliding operation detection section 88, an image display section 90 and an output section 92. These functional structures are realized by the CPU 62 reading and executing the program memorized at the ROM 64 or storage 68.

The driving mode acquisition section 84 acquires a driving mode of the vehicle V. More specifically, when the vehicle V is being driven by a vehicle occupant, the driving mode acquisition section 84 acquires the manual driving mode as the driving mode, and when the vehicle V is not being driven by a vehicle occupant, the driving mode acquisition section 84 acquires the autonomous driving mode as the driving mode. When the driving support mode is operating, the driving mode acquisition section 84 acquires the autonomous driving mode as the driving mode.

The vehicle speed acquisition section 86 acquires a speed of the vehicle V on the basis of signals from a speed sensor, which is not illustrated in the drawings, mounted at the vehicle V.

The sliding operation detection section 88 detects when sliding operations are performed at the right side display portion 30R and the left side display portion 30L.

The image display section 90 displays predetermined images at the right side display portion 30R and left side display portion 30L. As an example in the present exemplary embodiment, when the driving mode is the manual driving mode, the image display section 90 displays the operation item relating to gear shift position at the display region 32L, and when the driving mode is the autonomous driving mode, the image display section 90 displays the operation item relating to vehicle-to-vehicle distance at the display region 32L.

When a sliding operation is detected, the image display section 90 moves an image within a display region in accordance with the sliding operation. For example, in FIG. 3, the image displayed in the display region 32L that depicts the present vehicle is moved in accordance with a sliding operation. More specifically, the image is moved in a direction of sliding by a distance that the vehicle occupant slides their finger.

At a time of switching from the autonomous driving mode to the manual driving mode, the image display section 90 switches the content of this display region to content relating to the gear shift position. In other words, the image display section 90 transitions from the state in FIG. 4 to the state in FIG. 3.

In the manual driving mode when the vehicle speed is greater than zero, that is, in a running state, the image display section 90 tones down the display region 32L.

The output section 92 outputs signals corresponding to sliding operations. For example, when the image of the vehicle in FIG. 3 is disposed at "R" by a sliding operation by the vehicle occupant, signals are outputted in order to switch the gear shift position to reverse.

Operation

Now, operation of the input device 14 according to the present exemplary embodiment is described.

Figure 7:
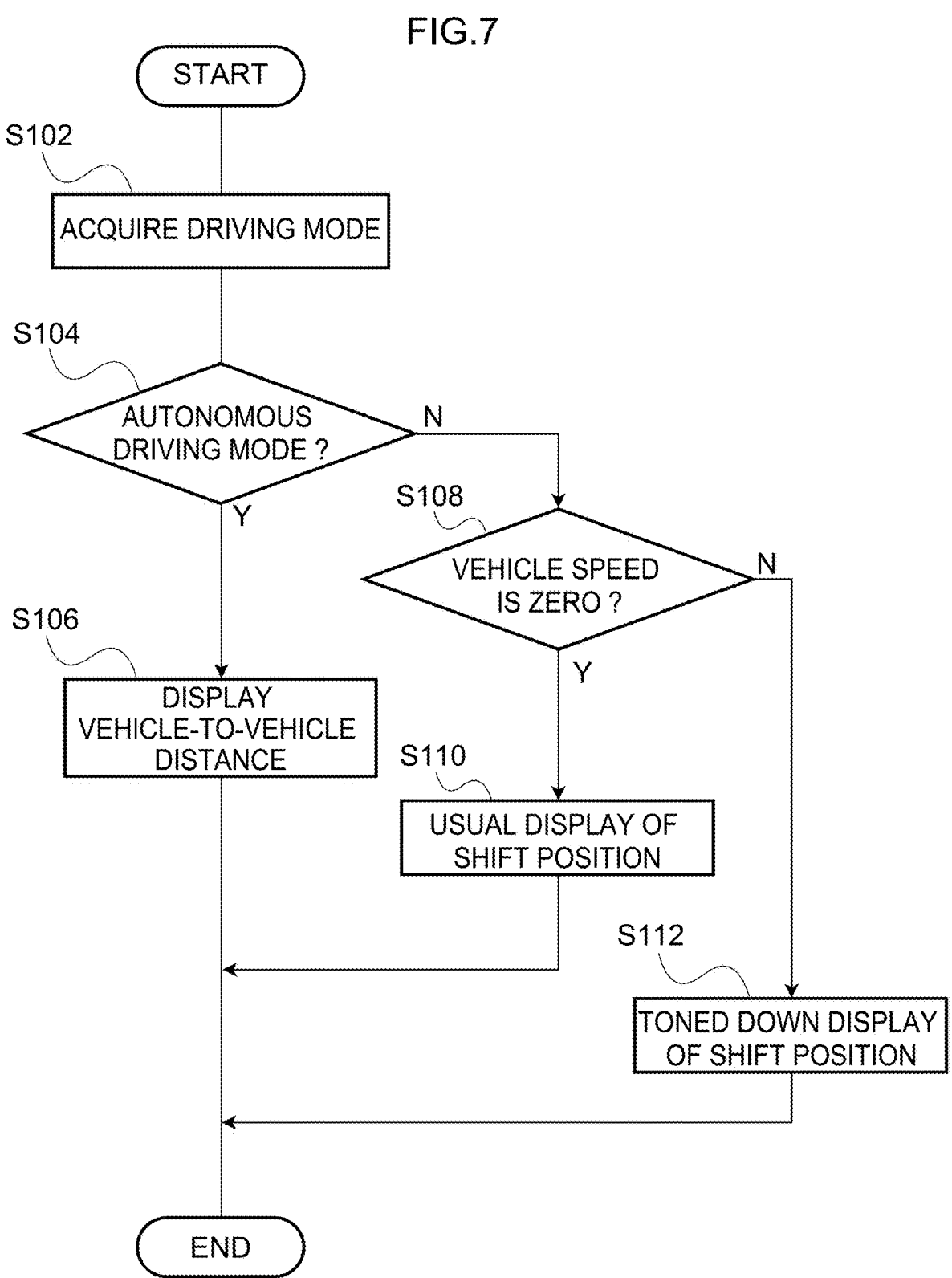
FIG. 7 is a flowchart illustrating an example of a flow of display processing at the input device for a vehicle according to the exemplary embodiment.

An example of display processing by the input device 14 according to the present exemplary embodiment is described using the flowchart illustrated in FIG. 7. This display processing is implemented by the CPU 62 reading a display program from the ROM 64 or storage 68, loading the display program into the RAM 66, and executing the program.

Example of Display Processing

In step S102, the CPU 62 acquires a driving mode of the vehicle V. More specifically, by the functioning of the driving mode acquisition section 84, the CPU 62 acquires information as to whether the driving mode is a manual driving mode or an autonomous driving mode.

In step S104, the CPU 62 makes a determination as to whether the driving mode is the autonomous driving mode. When the driving mode of the vehicle V is the autonomous driving mode, the CPU 62 advances to the processing of step S106, and when the driving mode of the vehicle V is the manual driving mode, the CPU 62 advances to the processing of step S108.

In step S106, the CPU 62 displays a vehicle-to-vehicle distance at the input device 14. More specifically, by the functioning of the image display section 90, the CPU 62 displays content relating to setting a vehicle-to-vehicle distance between a preceding vehicle and the present vehicle, as in the display region 32L in FIG. 4. The CPU 62 then ends the display processing.

Alternatively, when the vehicle V is running in the manual driving mode, the CPU 62 makes a determination in step S108 as to whether the speed of the vehicle V is zero. More specifically, by the functioning of the vehicle speed acquisition section 86, the CPU 62 acquires the speed of the vehicle V, and when the vehicle speed is zero, that is, when the vehicle V is stopped, the CPU 62 advances to the processing of step S110. When the vehicle speed is not zero, that is, when the vehicle V is running, the CPU 62 advances to the processing of step S112.

When the vehicle V is stopped, in step S110 the CPU 62 displays information relating to the gear shift position at the input device 14. More specifically, by the functioning of the image display section 90, the CPU 62 displays content relating to the gear shift position as in the display region 32L in FIG. 3. The CPU 62 then ends the display processing.

On the other hand, when the vehicle V is running, in step S112 the CPU 62 displays the information relating to the gear shift position at the input device 14 toned down. More specifically, by the functioning of the image display section 90, the CPU 62 implements a display of the information relating to the gear shift position in a state that is toned down relative to the content displayed in the display region 32L in FIG. 3. The CPU 62 then ends the display processing.

As described above, in the input device 14 according to the present exemplary embodiment, the display regions 32R, 33R, 35R, 32L, 33L and 35L in which predetermined images are displayed are provided at a vehicle cabin front portion, and the touch sensor TSR and touch sensor TSL are provided at these display regions. When the input device for a vehicle 14 detects a sliding operation in which an image is slid within a display region, on the basis of signals received from the touch sensor TSR and touch sensor TSL, the input device 14 outputs signals corresponding to the sliding operation to on-board equipment. The image moves in the display region in accordance with the sliding operation. Therefore, a vehicle occupant may instinctively control the on-board equipment while seeing positions of the image.

In particular in the present exemplary embodiment, because the input device 14 is provided between the steering handle 12 and the instrument panel 16, the input device 14 is easier for the vehicle occupant to operate than a structure in which a display region is provided at the instrument panel 16.

In the present exemplary embodiment, because a display region may be operated while a finger is resting on the finger rest portion 31, operability may be improved. Furthermore in the present exemplary embodiment, because operation items with higher frequencies of operation are displayed at positions that are easier for the vehicle occupant to operate, comfort may be improved.

In the present exemplary embodiment, because information about on-board equipment relating to running of the vehicle is displayed in a region at the vehicle left side relative to the steering handle 12, that is, at the opposite side of the steering handle 12 from the side thereof at which a passenger side seat is disposed, accidental operation by an occupant of the passenger side seat may be inhibited.

In the present exemplary embodiment, because information on on-board equipment relating to matters other than running of the vehicle V is displayed in a region at the vehicle right side relative to the steering handle 12, that is, at the side thereof at which the passenger side seat is disposed, even an occupant of the passenger side seat may perform an operation easily.

In the present exemplary embodiment, because the display is toned down during travel of the vehicle V, distraction caused by the display may be suppressed The input device 14 according to the present exemplary embodiment is described above, but it will be clear that numerous embodiments are possible within a scope not departing from the gist of the present disclosure. As illustrated in FIG. 2, the present exemplary embodiment has a structure in which a recess portion for resting a finger is formed as an example of the finger rest portion 31, but this is not limiting. For example, the variant example structure illustrated in FIG. 8 may be employed.

Variant Example

Figure 8:
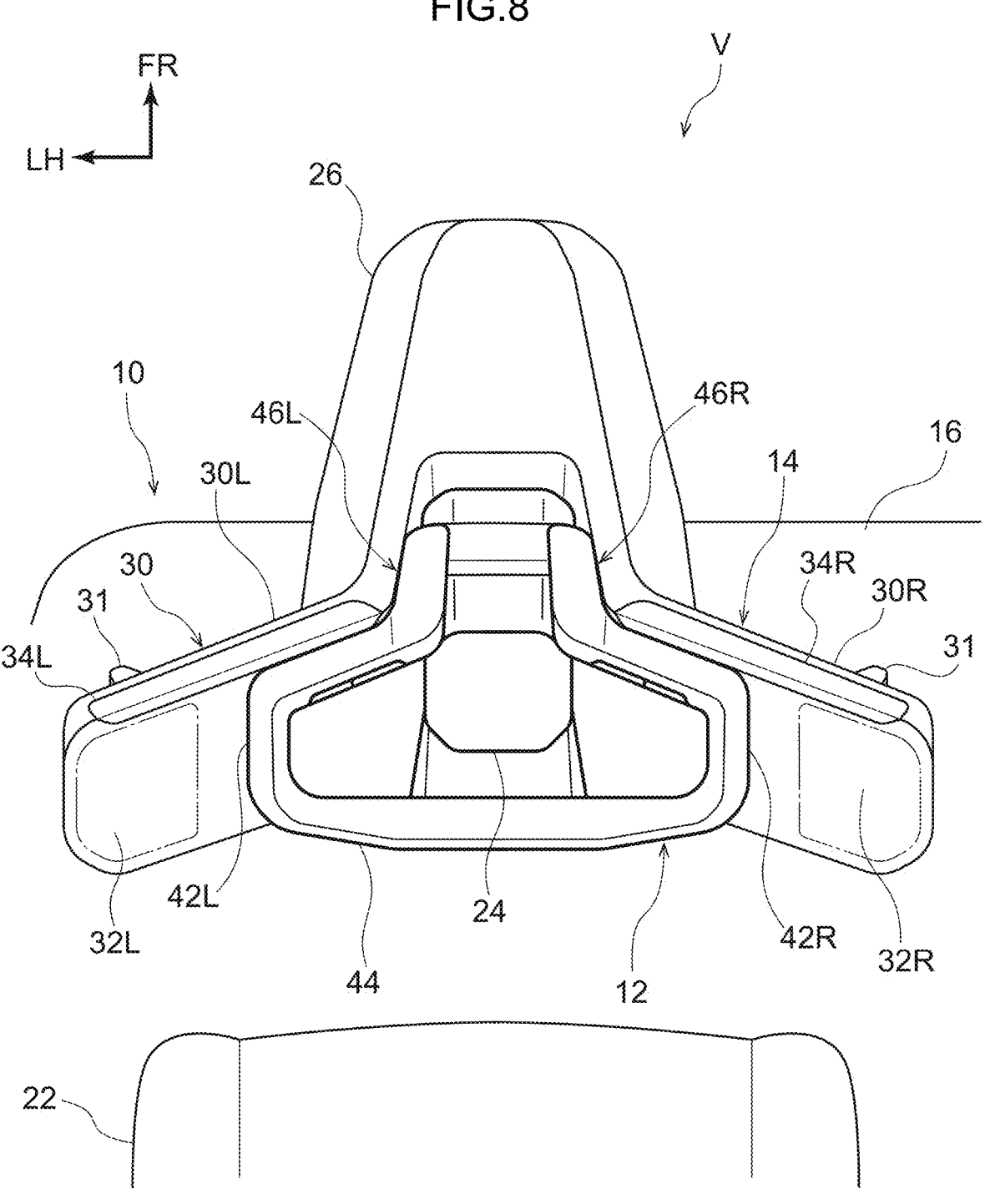
FIG. 8 is a schematic view illustrating an input device for a vehicle according to a variant example.

FIG. 8 is a diagram illustrating the input device for a vehicle 14 according to the variant example. As illustrated in FIG. 8, in the present variant example the finger rest portions 31 are formed protruding to the vehicle front side from, respectively, a front face of the right side display portion 30R and a front face of the left side display portion 30L.

The present variant example enables a vehicle occupant to rest their fingers without thicknesses of the right side display portion 30R and left side display portion 30L being reduced. Shapes of the finger rest portions 31 are not particularly limited. For example, the finger rest portions 31 may be formed in substantially semicircular shapes in plan view, and may be formed in polygonal shapes.

The display examples illustrated in FIG. 3 and FIG. 4 are merely examples; alternative images may be displayed.

The following additional notes are disclosed in relation to the exemplary embodiment described above.

Additional note 1

An input device for a vehicle includes a display region provided in a vehicle cabin front portion, configured such that a predetermined image is displayed at the display region, and a touch sensor being provided at the display region, wherein, when a sliding operation of the image in the display region is detected on the basis of signals received from the touch sensor, the input device for a vehicle is configured to:

output a signal corresponding to the sliding operation to on-board equipment; and move the image in the display region in accordance with the sliding operation.

Additional note 2

In the input device for a vehicle according to additional note 1, the display region is disposed between a steering handle and an instrument panel.

Additional note 3

In the input device for a vehicle according to additional note 2:

the display region is provided at each of:

a plate-shaped right side display portion that extends further toward a vehicle right side than the steering handle, and that has a thickness direction in a vehicle front-rear direction, and a plate-shaped left side display portion that extends further toward the vehicle left side than the steering handle, and that has a thickness direction in the vehicle front-rear direction; and finger rest portions are provided at faces at an opposite side of the right side display portion and of the left side display portion from sides thereof at which the display region is provided.

Additional note 4

In the input device for a vehicle according to additional note 2 or additional note 3:

the display region spans from an outer side to an inner side of the steering handle as viewed from a vehicle rear side;

an operation item having a high relative frequency of operation is displayed in a region of the display region at the outer side of the steering handle; and an operation item having a low relative frequency of operation is displayed in a region of the display region at the inner side of the steering handle.

Additional note 5

In the input device for a vehicle according to any one of additional notes 2 to 4, information on on-board equipment relating to travel of the vehicle is displayed in a region of the display region at a vehicle width direction outer side relative to the steering handle.

Additional note 6

In the input device for a vehicle according to any one of additional notes 2 to 5, information on on-board equipment relating to a matter other than travel of the vehicle is displayed in a region of the display region at a vehicle width direction inner side relative to the steering handle.

Additional note 7

In the input device for a vehicle according to additional note 5, content relating to a current gear shift position of the vehicle is displayed in the region of the display region at the vehicle width direction outer side relative to the steering handle and, during travel of the vehicle, the brightness of the content is toned down compared to when the vehicle is stopped.

Additional note 8

In the input device for a vehicle according to additional note 7, during travel in a driving support mode that autonomously performs accelerator operations and steering, content relating to setting of an inter-vehicle distance relative to a preceding vehicle is displayed in the region of the display region at the vehicle width direction outer side relative to the steering handle.

Additional note 9

In the input device for a vehicle according to additional note 8, at a time of switching from the driving support mode to manual driving, the content of the display region is switched to the content relating to the gear shift position.

What is claimed is:

1. An input device for a vehicle, the input device comprising a display region provided in a vehicle cabin front portion, configured such that a predetermined image is displayed at the display region, and a touch sensor being provided at the display region, wherein, when a sliding operation of the image in the display region is detected on a basis of signals received from the touch sensor, the input device for a vehicle is configured to:

output a signal corresponding to the sliding operation to on-board equipment;

and move the image in the display region in accordance with the sliding operation, wherein the display region is provided at a plate-shaped display portion that has a thickness direction in a vehicle front-rear direction, and wherein a finger rest portion extending perpendicular to the vehicle front-rear direction is provided on a face at a vehicle front side of the display portion.

2. The input device for a vehicle according to claim 1, wherein the display region is disposed at the vehicle rear side relative to an instrument panel.

3. The input device for a vehicle according to claim 2, wherein the plate-shaped display portion includes a right side display portion and a plate-shaped left side display portion, the plate-shaped right side display portion extends further toward a vehicle right side than a steering handle, and that has a thickness direction in the vehicle front-rear direction, and the plate-shaped left side display portion extends further toward the vehicle left side than the steering handle, and that has a thickness direction in the vehicle front-rear direction; and wherein the finger rest portion includes finger rest portions that are provided at faces at an opposite side of the right side display portion and of the left side display portion from sides thereof at which the display region is provided.

4. The input device for a vehicle according to claim 2, wherein:

the display region spans from an outer side to an inner side of a steering handle as viewed from a vehicle rear side;

an operation item having a high relative frequency of operation is displayed in a region of the display region at the outer side of the steering handle; and an operation item having a low relative frequency of operation is displayed in a region of the display region at the inner side of the steering handle.

5. The input device for a vehicle according to claim 2, wherein information on on-board equipment relating to travel of the vehicle is displayed in a region of the display region at a vehicle width direction outer side relative to a grip portion of a steering handle.

6. The input device for a vehicle according to claim 5, wherein content relating to a current gear shift position of the vehicle is displayed in the region of the display region at the vehicle width direction outer side relative to the steering handle and, during travel of the vehicle, a brightness of the content is toned down compared to when the vehicle is stopped.

7. The input device for a vehicle according to claim 6, wherein during travel in a driving support mode that autonomously performs accelerator operations and steering, content relating to setting of an inter-vehicle distance relative to a preceding vehicle is displayed in the region of the display region at the vehicle width direction outer side relative to the steering handle.

8. The input device for a vehicle according to claim 7, wherein at a time of switching from the driving support mode to manual driving, the content of the display region is switched to the content relating to the gear shift position.

9. The input device for a vehicle according to claim 2, wherein information on on-board equipment relating to a matter other than travel of the vehicle is displayed in a region of the display region at a vehicle width direction inner side relative to a grip portion of a steering handle.

10. The input device for a vehicle according to claim 1, wherein the display region is disposed at a vehicle width direction outer side relative to a steering handle.

11. An input device for a vehicle, the input device comprising a display region provided in a vehicle cabin front portion, configured such that a predetermined image is displayed at the display region, and a touch sensor being provided at the display region, wherein, when a sliding operation of the image in the display region is detected on a basis of signals received from the touch sensor, the input device for a vehicle is configured to:

output a signal corresponding to the sliding operation to on-board equipment;

and move the image in the display region in accordance with the sliding operation; wherein the display region is disposed at the vehicle rear side relative to an instrument panel; wherein the display region spans from an outer side to an inner side of a steering handle as viewed from a vehicle rear side;

an operation item having a high relative frequency of operation is displayed in a region of the display region at the outer side of the steering handle; wherein an operation item having a low relative frequency of operation is displayed in a region of the display region at the inner side of the steering handle; and wherein a finger rest portion extending perpendicular to the vehicle front-rear direction is provided on a face at a vehicle front side face of the display region.

12. An input device for a vehicle, the input device comprising a display region provided in a vehicle cabin front portion, configured such that a predetermined image is displayed at the display region, and a touch sensor being provided at the display region, wherein, when a sliding operation of the image in the display region is detected on a basis of signals received from the touch sensor, the input device for a vehicle is configured to:

output a signal corresponding to the sliding operation to on-board equipment;

and move the image in the display region in accordance with the sliding operation; wherein the display region is disposed at the vehicle rear side relative to an instrument panel; wherein information on on-board equipment relating to travel of the vehicle is displayed in a region of the display region at a vehicle width direction outer side relative to a grip portion of a steering handle; wherein content relating to a current gear shift position of the vehicle is displayed in the region of the display region at the vehicle width direction outer side relative to the steering handle and, during travel of the vehicle, a brightness of the content is toned down compared to when the vehicle is stopped; and wherein a finger rest portion extending perpendicular to the vehicle front-rear direction is provided on a face at a vehicle front side of the display region.

13. The input device for a vehicle according to claim 12, wherein during travel in a driving support mode that autonomously performs accelerator operations and steering, content relating to setting of an inter-vehicle distance relative to a preceding vehicle is displayed in the region of the display region at the vehicle width direction outer side relative to the steering handle.

14. The input device for a vehicle according to claim 13, wherein at a time of switching from the driving support mode to manual driving, the content of the display region is switched to the content relating to the gear shift position.

\*　\*　\*　\*　\*